United States Patent
Krüger et al.

(10) Patent No.: US 8,109,039 B2
(45) Date of Patent: Feb. 7, 2012

(54) UNIT SUPPORT FOR A MOTOR VEHICLE DOOR

(75) Inventors: Harald Krüger, Erlangen (DE); Olaf Kriese, Coburg (DE); Martin Schlechtriemen, Oberhaid (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 978 days.

(21) Appl. No.: 11/988,671

(22) PCT Filed: Jul. 10, 2006

(86) PCT No.: PCT/DE2006/001217
§ 371 (c)(1),
(2), (4) Date: Mar. 7, 2008

(87) PCT Pub. No.: WO2007/006296
PCT Pub. Date: Jan. 18, 2007

(65) Prior Publication Data
US 2010/0084887 A1    Apr. 8, 2010

(30) Foreign Application Priority Data
Jul. 11, 2005  (DE) .......................... 10-2005-033-115

(51) Int. Cl.
*E05F 15/08*  (2006.01)
(52) U.S. Cl. ................. 49/349; 49/348; 49/352
(58) Field of Classification Search ........... 49/348, 49/349, 352, 502
See application file for complete search history.

(56) References Cited

U.S. PATENT DOCUMENTS
5,657,580 A * 8/1997 Kobrehel ........................ 49/352
(Continued)

FOREIGN PATENT DOCUMENTS
DE        199 37 000 A1    2/2001
(Continued)

OTHER PUBLICATIONS
International Search Report, dated Dec. 8, 2006, corresponding to PCT/DE2006/001217.
(Continued)

*Primary Examiner* — Jerry Redman
(74) *Attorney, Agent, or Firm* — Christie, Parker & Hale, LLP

(57) ABSTRACT

A unit support for a motor vehicle door includes at least one longitudinally extended guide rail of a motor vehicle window lifter arranged on the unit support, which extends between a first and a second end portion and on which a drive element serving to receive a window pane to be adjusted along an adjusting path of the guide rail defined by guide surfaces is movably guided. A hollow body is integrally formed on the unit support in the region of at least one end portion of the guide rail. The hollow body extends the guide surfaces of the guide rail serving to guide the drive element, defining the adjusting path and/or a deflection element is provided on the hollow body for deflecting a flexible traction means of the window lifter, in order to increase the length of travel of the motor vehicle window lifter in the direction of extension of the guide rail.

48 Claims, 12 Drawing Sheets

U.S. PATENT DOCUMENTS

| | | | |
|---|---|---|---|
| 5,694,717 A * | 12/1997 | Gier | 49/352 |
| 6,161,337 A | 12/2000 | Morando | |
| 6,477,808 B1 | 11/2002 | Arquevaux et al. | |
| 6,604,325 B2 * | 8/2003 | Nicolai et al. | 49/348 |
| 7,467,494 B2 * | 12/2008 | Buchta | 49/352 |
| 7,882,658 B2 * | 2/2011 | Staser et al. | 49/352 |
| 2003/0140562 A1 * | 7/2003 | Staser et al. | 49/352 |
| 2006/0174542 A1 * | 8/2006 | Bernard et al. | 49/352 |
| 2006/0174543 A1 * | 8/2006 | Rothe et al. | 49/352 |
| 2006/0179720 A1 * | 8/2006 | Vantrease | 49/352 |
| 2006/0283088 A1 * | 12/2006 | Buchta | 49/352 |
| 2007/0214726 A1 * | 9/2007 | Graf et al. | 49/352 |
| 2008/0098655 A1 * | 5/2008 | Valentage | 49/352 |

FOREIGN PATENT DOCUMENTS

| | | |
|---|---|---|
| DE | 199 44 965 A1 | 3/2001 |
| EP | 0 561 440 A1 | 9/1993 |
| EP | 0 855 301 A1 | 7/1998 |
| EP | 1 132 234 A1 | 9/2001 |

OTHER PUBLICATIONS

English translation of International Preliminary Examination Report for corresponding PCT application No. PCT/DE2006/001217, dated Jan. 29, 2008.

* cited by examiner

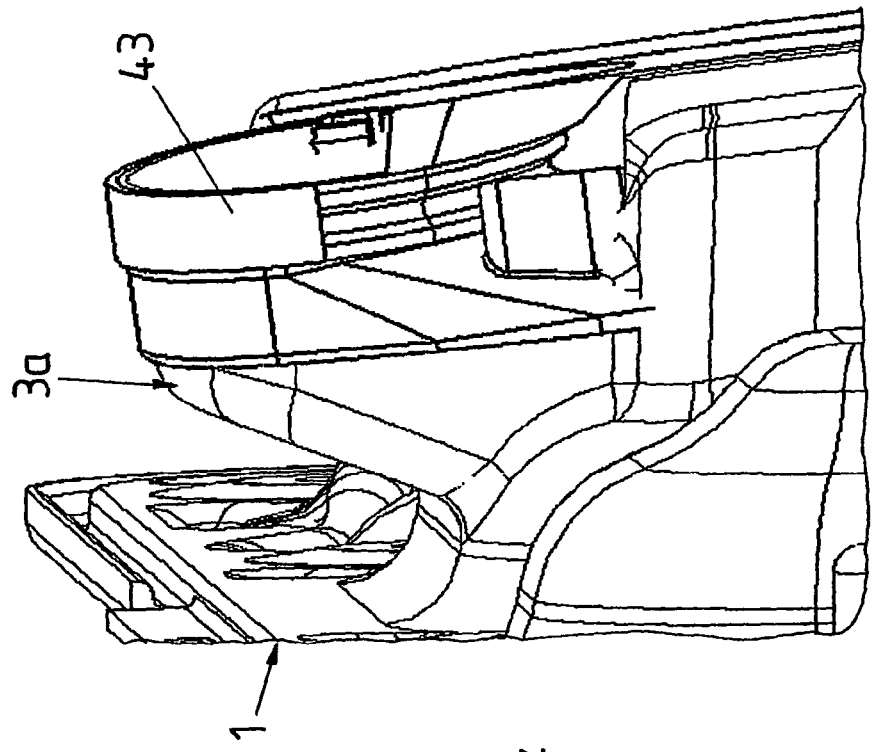
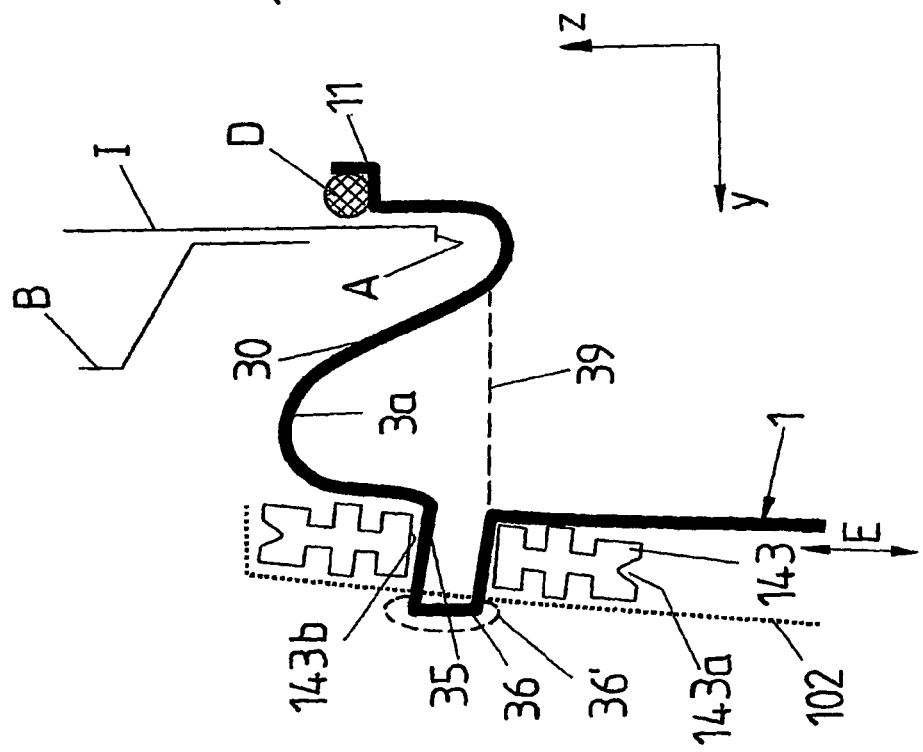

FIG 3A
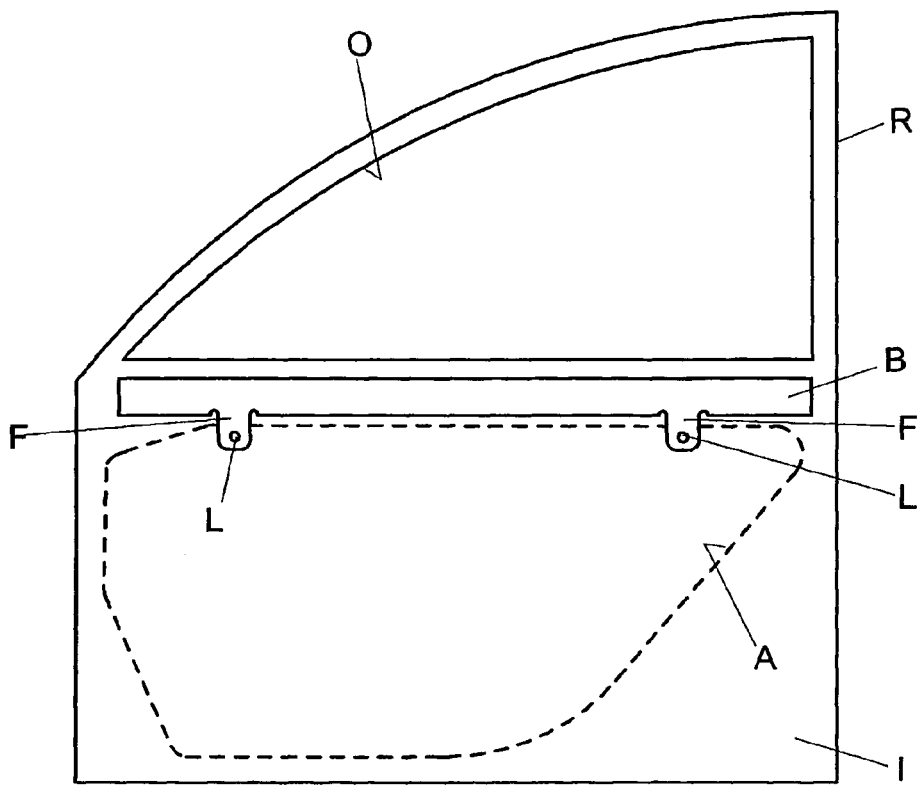
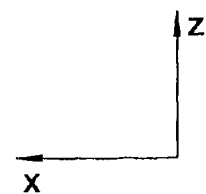

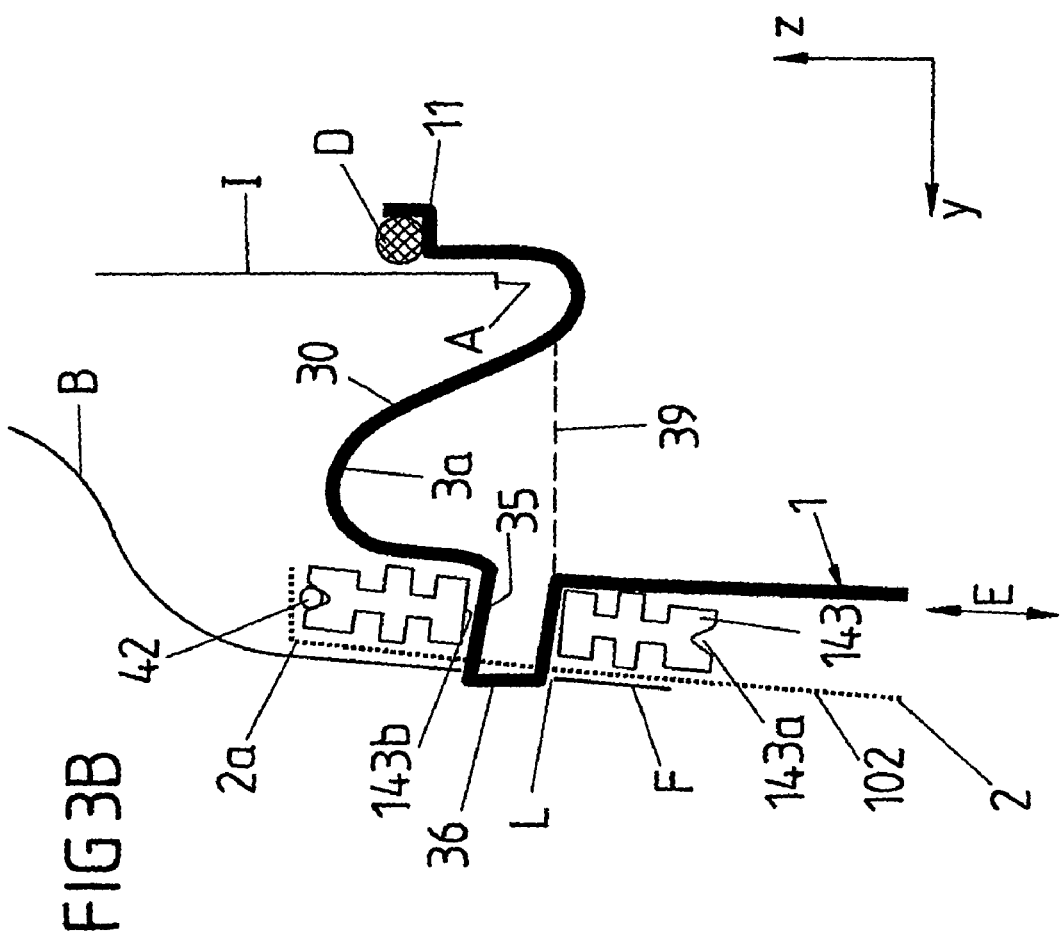

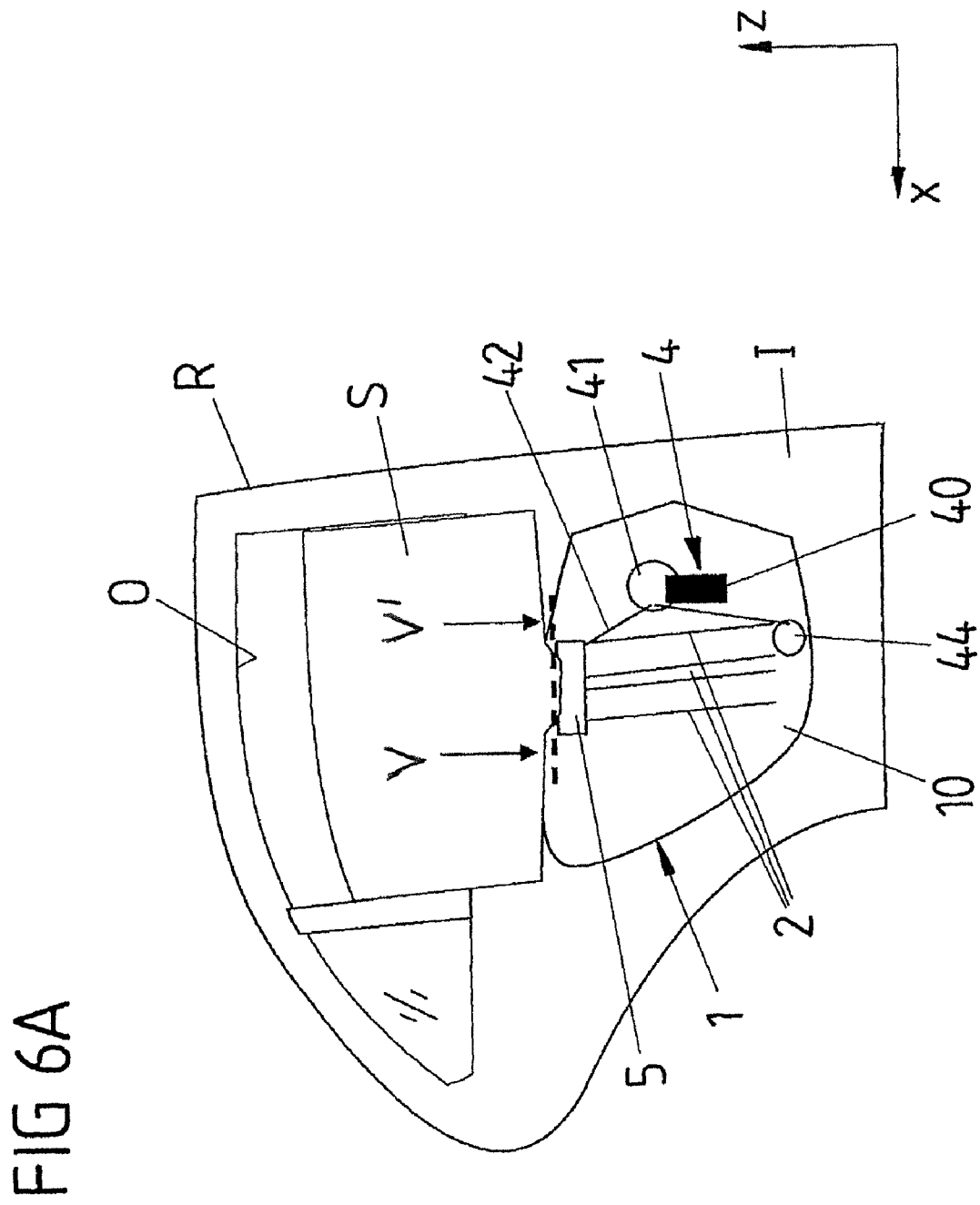

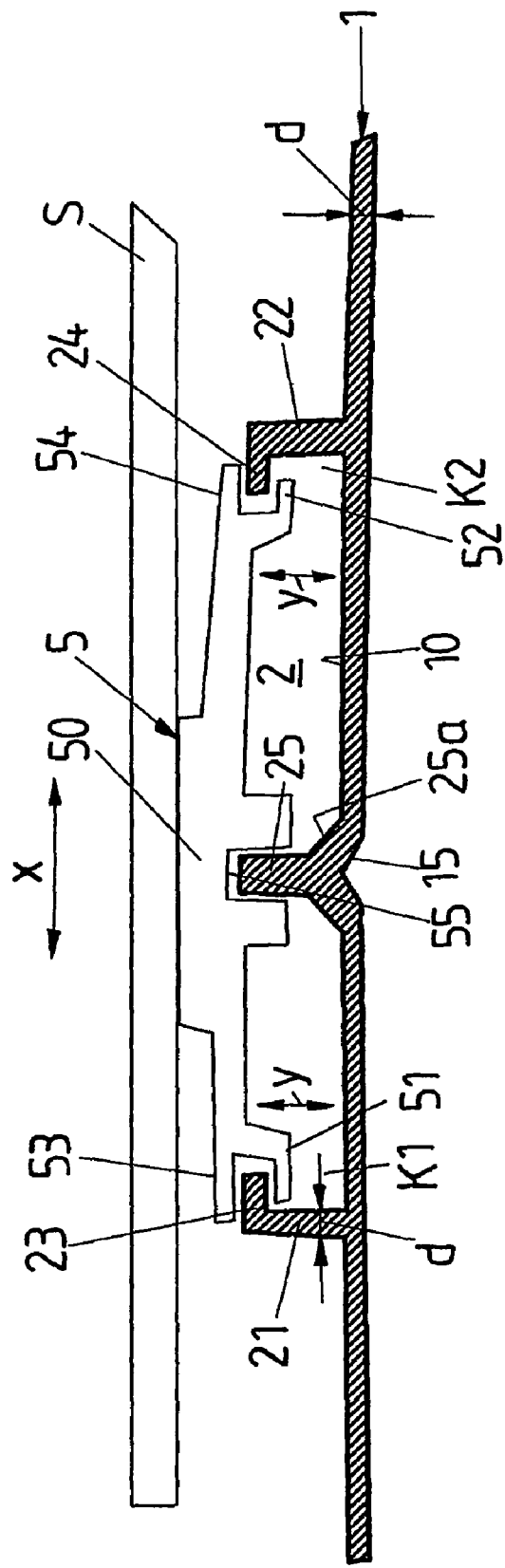

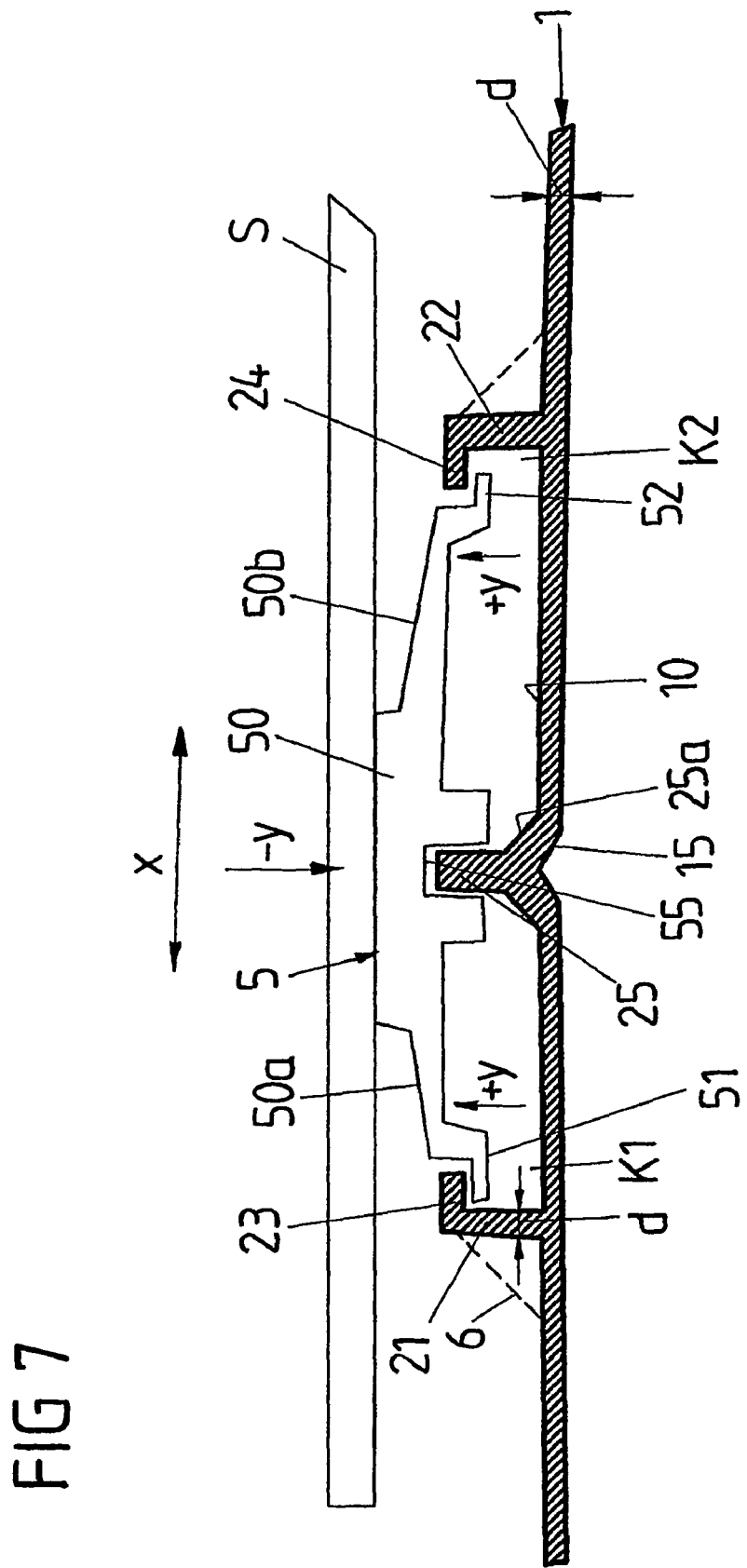

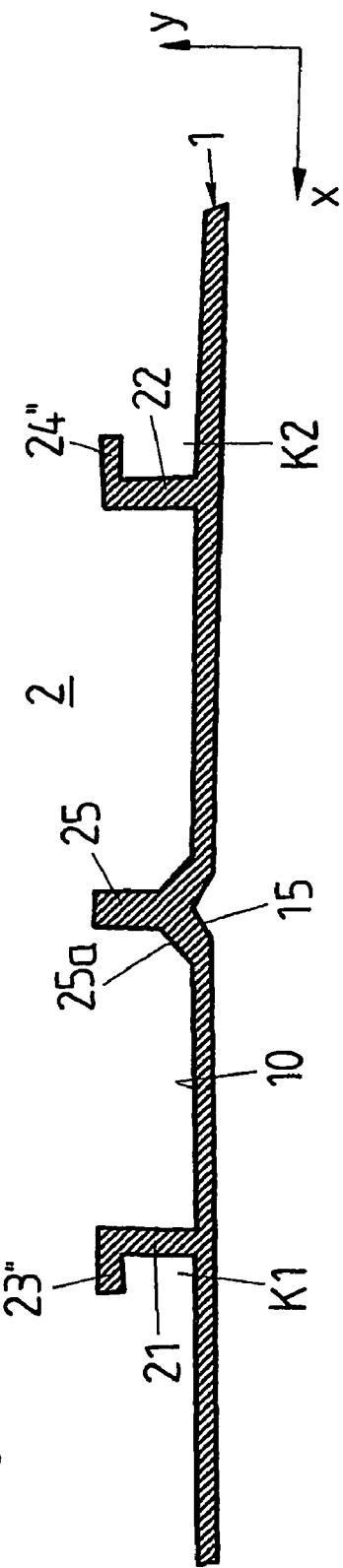
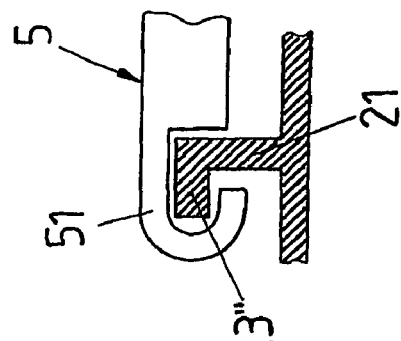
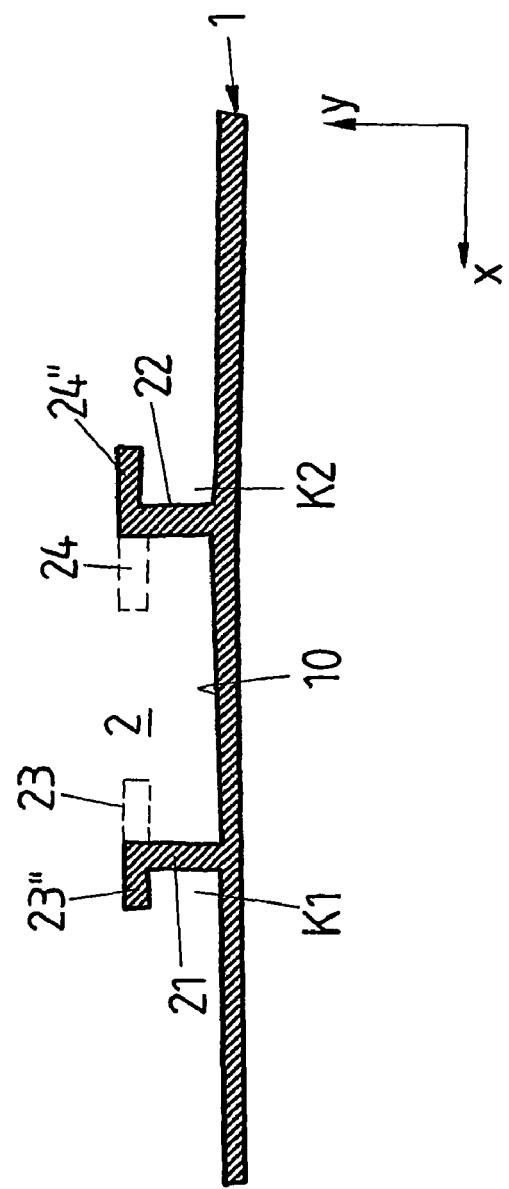

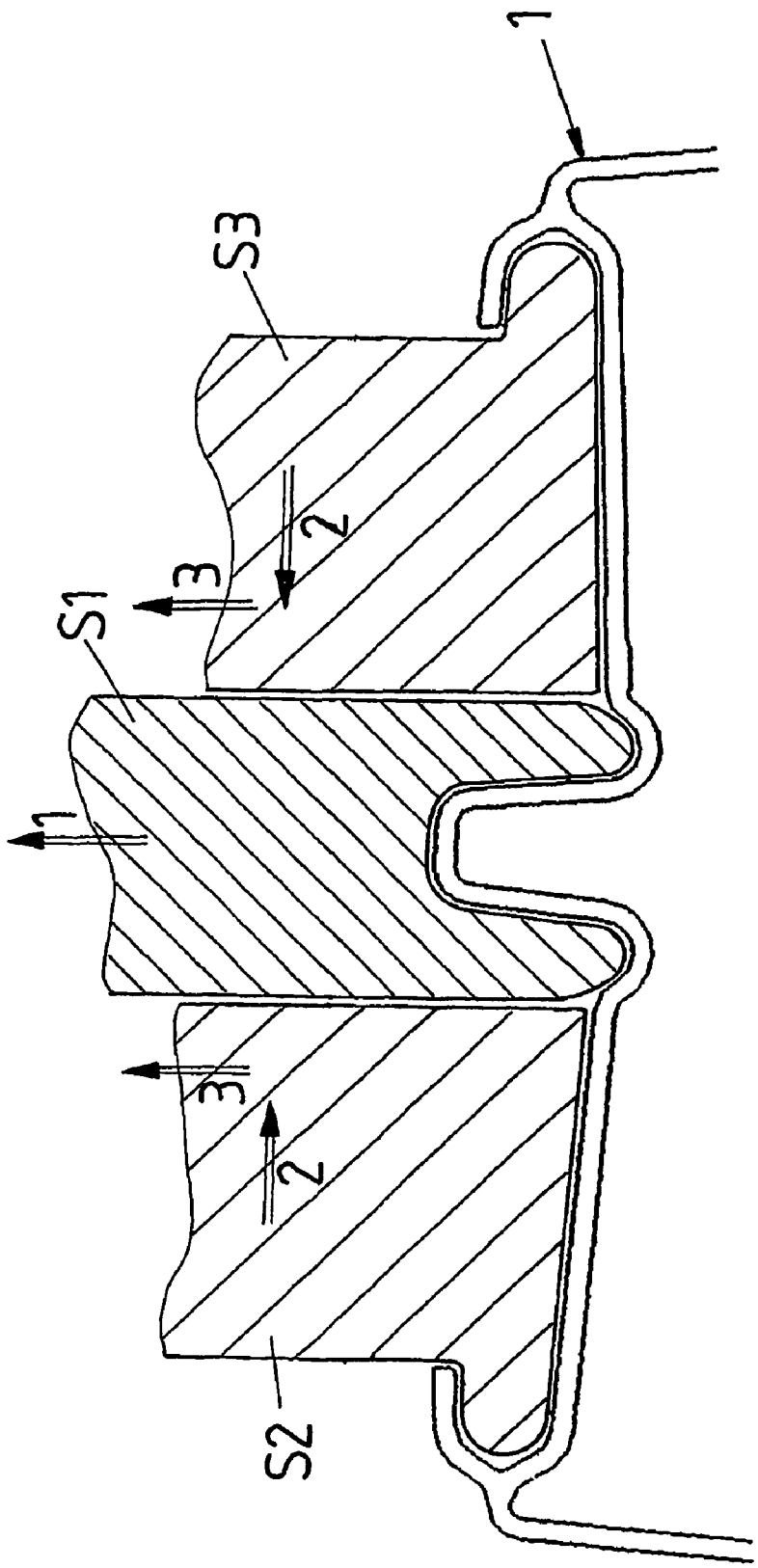

UNIT SUPPORT FOR A MOTOR VEHICLE DOOR

CROSS-REFERENCE TO A RELATED APPLICATION

This application is a National Phase Patent Application of International Patent Application Number PCT/DE2006/001217, filed on Jul. 10, 2006, which claims priority of German Patent Application Number 10 2005 033 115.7, filed on July 11, 2005.

BACKGROUND

The invention relates to a unit support for a motor vehicle door which is designed, i.e. is configured and provided, for installation in the motor vehicle door, and which in the installed state forms at least one part of a door inner skin of the motor vehicle door.

Such a unit support serves to receive different functional components of a motor vehicle door, such as for example a window lifter, a door lock, a speaker and the like. It may, on the one hand, substantially form the complete door inner skin, so that for installation in a motor vehicle door it is fastened to the door outer skin thereof—directly or via a connecting and reinforcing frame extending between the door inner skin and the door outer skin. On the other hand, the unit support may also form just one component of the door inner skin, for example by the unit support being able to be positioned on a door inner skin provided with a large-surface cutout and in this connection covering said cutout.

At least one guide rail forms a substantial component of the motor vehicle window lifter premounted on the unit support, which extends (in a direction of adjustment) between a first and a second end portion and on which a drive element of the window lifter is movably guided on an adjusting path (extending in the direction of adjustment). Said optionally curved adjusting path is defined by guide surfaces of the guide rail, in which the drive element positively and movably engages along the adjusting path in the direction of adjustment. The drive element is, on the one hand, coupled to an adjusting drive of the window lifter, for example via a traction means in the form of a cable or via a lever mechanism, so that a drive force generated by the adjusting drive may be transmitted to the drive element and it is thereby moved along the guide rail, in order to raise or lower a window pane to be adjusted by means of the window lifter and attached to the drive element—according to the direction of movement. To this end, the drive element is also connected in the known manner to the window pane to be adjusted.

An important consideration with the arrangement of a motor vehicle window lifter on a unit support is ensuring a sufficiently long window travel, i.e. a sufficiently long adjusting path of the drive element which may be moved along the guide rail and which carries the window pane, so that the window pane may be moved to and fro (may be raised and lowered) between a position which is as fully open as possible and a closed position in the associated window opening of a motor vehicle. This has to be achieved in a motor vehicle door with the restriction that usually only limited space is available for the guide rails of a window lifter, so that the length thereof in the direction of adjustment of the associated drive element and/or the window pane attached thereto may not be freely selected to maximize the window travel and that, moreover, such an installation of the unit support is possible in a motor vehicle door by said unit support, in the installed state, bearing—via a seal—in a moisture-tight manner against the door bodywork. The unit support, therefore, as a component of the door inner skin at the same time forms part of the wet/dry space partition of a motor vehicle door, which serves to separate the dry space located in front of the surface of the door inner skin on the vehicle interior side, from the wet space located behind the surface of the door inner skin on the exterior side.

Provided that the motor vehicle window lifter is a traction means window lifter, in which a flexible traction means is guided along the at least one guide rail, in order to raise or lower a drive element carrying the window pane to be adjusted and which is longitudinally movably in engagement with the guide rail and connected to the traction means, and on the guide rail in the direction of adjustment, deflection elements, in particular in the form of deflection rollers are therefore typically arranged on the unit support in the region of the guide rail, by means of which the flexible traction means is deflected such that a portion of the flexible traction means extends along the corresponding guide rail, the drive element associated with the guide rail being fastened to said portion of the flexible traction means. Considerable forces, which have to be absorbed, may act on the deflection elements and thus on the points at which the deflection elements are arranged on the unit support or a component connected thereto, such as for example a guide rail, during operation of the motor vehicle window lifter.

SUMMARY

The object underlying the invention is to provide a unit support of the aforementioned type which permits an optimization of a window lifter provided on the unit support by simple means.

According to an exemplary solution of an exemplary embodiment of the invention, a (pot-like) hollow body, in particular in the form of a hollow nose, is integrally formed on the unit support and which extends the adjusting path of the guide rail serving to guide the drive element and extending in the direction of adjustment of the drive element and/or on which a deflection element is provided for deflecting a flexible traction means of the motor vehicle window lifter, by means of which the flexible traction means is deflected such that a portion of the flexible traction means extends along the associated guide rail. The drive element which may be adjusted along the guide rail may be fastened to said portion of the flexible traction means.

According to the exemplary solution, therefore, the length of travel of the window lifter, i.e. the adjusting path of the drive element and thus of the window pane to be adjusted, is not solely determined by the length of the guide rails of the window lifter in the direction of adjustment but the length of travel is increased by the at least one hollow body integrally formed on the unit support, which extends (and thus lengthens) the adjusting path of the guide rail in the direction of adjustment as well as alternatively or additionally serving to receive a deflection element of the window lifter, which in turn defines a limit of the adjusting path of the drive element in the direction of adjustment; emerging from the deflection element, therefore, is the portion of the flexible traction means which extends along the guide rail and to which the drive element carrying the window pane is fastened. Thus, a displacement of the deflection element beyond one end of the guide rail also leads to an increase in the length of travel of the window lifter, i.e. the adjusting path of the drive element guided on the guide rail.

Moreover, further components of the window lifter, such as for example damping means, may also be secured (positioned) on such a hollow body.

In an exemplary embodiment, in the direction of extension of the associated guide rail the hollow body formed on the unit support extends beyond the seal and/or the sealing region, via which the unit support (along its peripheral outer edge) in the installed state bears against the door bodywork in a moisture-tight manner.

Thus with the exemplary solution according to the invention it may be achieved that the drive element may be moved beyond an edge portion of the unit support serving for sealingly fastening the unit support to a motor vehicle door, without the wet/dry space partition being compromised.

The hollow body may further be used to reinforce the unit support in the region of the associated end of the relevant guide rail, for which purpose the hollow body is preferably configured as substantially closed, and for example has only one opening on a front face facing the unit support. In other words, the hollow body is configured as a (pot-like, more specifically nose-shaped) hollow body which is open on only one side, but closed on all remaining sides.

The cross-sectional area of said opening is thus exemplary substantially oriented perpendicular to the surface and/or plane which is spanned by the unit support, i.e. the so-called door plane. Relative to the state installed in a motor vehicle, the door plane is typically spanned by the longitudinal vehicle axis (x-axis) extending in the forward driving direction as well as the vertical vehicle axis (z-axis) extending from the vehicle floor toward the vehicle roof. The door plane is accordingly formed by the so-called xz plane. The opening of the hollow body extends in contrast preferably in the plane, i.e. the xy plane, spanned by the longitudinal vehicle axis (x-axis) and the horizontal vehicle transverse axis (y-axis) extending perpendicular both relative to the longitudinal vehicle axis and to the vertical vehicle axis. This means that the opening of the hollow body of the hollow body faces the middle region (central region) of the unit support. The opening also serves, in particular, for being able to demold more easily a mold used for producing the hollow body (for example by injection molding).

The hollow body extends exemplary in the direction of extension of the guide rail and tapers in this direction away from the associated end of the relevant guide rail.

Provided that the guide rail is integrally formed on the unit support, the hollow body may in turn be integrally formed on the associated end of the guide rail, and preferably projects in this case beyond the actual end of the guide rail (without the hollow body).

A deflection element possibly provided on the hollow body may either be integrally formed thereon or secured thereto as a separate component. In the last-mentioned case, the hollow body may comprise a bearing pin on which the deflection element provided with a bearing opening is (rotatably) mounted, the bearing pin moreover comprising a widening on a front face (for example produced by plastic deformation) which overlaps the edge of the bearing opening of the deflection element.

According to an exemplary development of the invention, the deflection element provided on the hollow body in the installed state of the unit support is overlapped by a window sill reinforcement of the motor vehicle door which at the same time may serve for mounting the deflection element.

A further exemplary aspect of the invention which may also be advantageously implemented irrespective of the subject-matter of the invention disclosed above, particularly relates to the case where a guide rail for a motor vehicle window lifter is integrally incorporated in the unit support, i.e. is formed thereon. On the guide rail incorporated integrally in the unit support, a drive element of the window lifter is movably guided along an adjusting path which, on the one hand, is coupled to an adjusting drive of the window lifter, for example via a traction means in the form of a cable or via a lever mechanism, so that a drive force generated by the adjusting drive may be transmitted to the drive element and as a result is moved along the guide rail, in order to raise or lower a window pane to be adjusted by means of the window lifter—according to the direction of movement. On the other hand, the drive element is also connected in the known manner to the window pane to be adjusted.

The integral incorporation of a guide rail in the unit support reduces the number of components required during assembly of the window lifter and leads therefore to a simplified construction and a simplification of assembly. Nevertheless, it should be noted that during operation of the window lifter considerable forces may act on the guide rail, so that corresponding requirements with regard to stability and rigidity may be set for the guide rail as well as for the connection thereof to the unit support. This applies, in particular, in the case of a unit support consisting of plastics which offers the advantage that the integral forming of a guide rail for the window lifter is possible in a particularly simple manner.

One possibility for ensuring sufficient rigidity of the guide rail as well as a stable connection to the unit support consists in the formation of reinforcing ribs; in this case, however, a tendency to distortion during the production process of the unit support has to be prevented.

It is, therefore, a further object to provide a unit support which, with a simple construction as a result of an integrally formed guide rail for a motor vehicle window lifter, is characterized by high stability and rigidity. To this end, the guide rail formed integrally on the unit support comprises at least two guide channels, which are spaced apart from one another transversely to the direction of adjustment of the drive element (and thus the window pane) defined by the adjusting path, and in which one respective guide portion of the associated drive element is displaceably guided along the guide rail.

By forming two guide channels spaced apart from one another for guiding the drive element on the unit support, on the one hand a reliable, defined guiding of the drive element is ensured, by the drive element acting with one respective guide portion in respectively one of the two guide channels. On the other hand, the two guide channels at the same time contribute to the reinforcement of the unit support in the region of the guide rail and thus both to a reinforcement of the guide rail itself and to a reinforcement of the connection of the guide rail to the unit support.

Such guide channels may be formed, as will be shown hereinafter with reference to different embodiments, easily during the production of a unit support, for example by injection molding, by an injection mold being used with correspondingly movable sliding cores during the production of the unit support.

Thus a high degree of rigidity and stability of the unit support may be achieved in the region of the guide rail, in particular with a substantially uniform wall thickness (material thickness) of the unit support, both in the regions outside the guide rail and in the region of the guide rail itself.

In this connection, the lateral guide channels at the transition with the associated surface of the unit support are preferably closed which in addition to maximizing the rigidity of the drive element, also results in preventing the drive element from falling out to the side.

According to an exemplary embodiment, the respective guide channel of the guide rail is formed by a projection projecting from a surface of the unit support which, together with said surface of the unit support, defines a channel-like guide for the respectively associated guide portion of the drive element. To this end, the respective projection has, for example, an (angled) portion which overlaps the respectively associated guide portion of the drive element and thus may be encompassed thereby at the same time.

In this case, the two angled portions exemplary project in different directions from the respectively associated projection of the unit support defining a guide channel, for example such that the two angled portions face one another or are remote from one another.

According to an exemplary development of the invention which, in particular, simplifies the demolding of an injection mold used for producing the unit support, the angled portions of the projections projecting from the unit support extend at an angle from the associated surface of the unit support and namely such that they face with their free ends away from the surface of the unit support.

For additional stabilization of the unit support in the region of the guide rail as well as for a particularly defined guiding of the drive element on the guide rail, additionally to the two channels a projection extending between the two channels—and spaced apart from each of the two channels—may be formed on the unit support, which is encompassed by an associated central portion of the drive element guided movably on the guide rail.

For a further increase in the rigidity of the unit support in the region of the guide rail, in this case—additionally to the two guide channels—reinforcing beads and bulged portions may be provided which are not used for guiding the drive element itself but instead primarily for additional reinforcement of the guide rails. Said reinforcing beads or bulged portions may, for example, be incorporated in the guide channels of the guide rail, may be provided in the transition region between one respective guide channel and the surface of the unit support or (primarily between the two guide rails) may be formed directly in the surface of the unit support.

Further components of a window lifter may advantageously also be formed on the unit support in the region of the guide rail, such as for example an access lock for a traction means of the window lifter, for electrical cables and/or for an actuating Bowden cable or an actuating rod assembly of a closure system. Moreover, water repellent regions may be formed on the unit support.

Finally, additional reinforcing means, possibly also reinforcing ribs may be locally formed on the guide channels—outside the guide surfaces serving to guide the drive element—in order to correct local deformation.

BRIEF DESCRIPTION OF THE DRAWINGS

Further details and advantages of the invention will become apparent in the following description of embodiments with reference to the figures, in which:

FIG. 1c shows a second perspective view of the guide rail of FIG. 1a in the region of the upper end thereof.

FIG. 2 shows a cross section through the upper end of a guide rail in a modified embodiment relative to FIGS. 1a to 1c.

FIG. 3a shows a schematic side view of a motor vehicle door with a door inner skin comprising a large-surface cutout.

FIG. 3b shows a cross section through the motor vehicle door of FIG. 3a in the region of the upper edge of the cutout, said cutout being covered by a unit support carrying a guide rail.

FIG. 6a shows a unit support of the type shown in FIG. 1a after installation in a motor vehicle door.

FIG. 6b shows a cross section taken through the line V-V$^1$ of FIG. 6a through the unit support of FIG. 6a in the region of the guide rail.

FIG. 6c shows a cross-section taken through the line V-V$^1$ of FIG. 6a of a first modification of the guide rail of FIG. 6b with a drive element being omitted.

FIG. 7 shows a cross-section taken through the line V-V$^1$ of FIG. 6a of a second modification of the guide rail of FIG. 6b.

FIG. 8 shows a cross-section taken through the line V-V$^1$ of FIG. 6a of a third modification of the guide rail of FIG. 6b with a drive element being omitted.

FIG. 9 shows a cross-section taken through the line V-V$^1$ of FIG. 6a of a fourth modification of the guide rail of FIG. 6b with a drive element being omitted.

FIG. 9a shows a detail of the guide rail of FIG. 9.

FIG. 11 shows a schematic view of an injection mold which may be used for producing a guide rail according to FIG. 10.

DETAILED DESCRIPTION

Figure 1A:
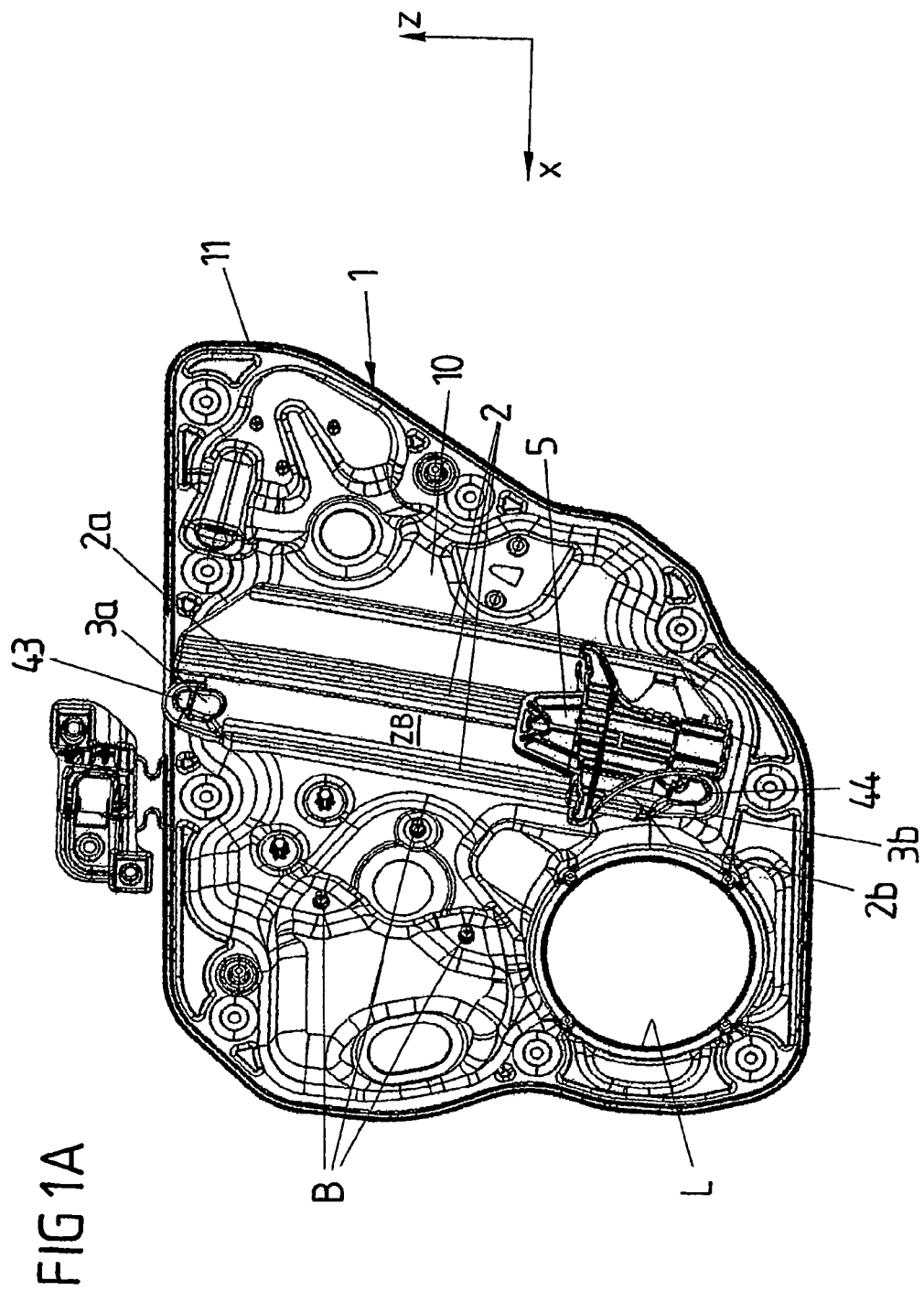
FIG. 1a shows a unit support for installation in a motor vehicle door comprising an integrally formed guide rail for a motor vehicle window lifter and comprising a drive element guided thereon.

Shown in perspective in FIG. 1a is a unit support 1 for a motor vehicle door, which is provided configured for installing in a motor vehicle door, and namely for arranging on the door inner skin of a motor vehicle door, the unit support 1 covering a large-surface cutout of the door inner skin and with its outer peripheral edge 11 bearing sealingly against the door inner skin via a seal.

The unit support 1 forms in this state, installed in a motor vehicle door, a component of the door inner skin and serves together with said door inner skin to separate the wet space from the dry space of the motor vehicle door. The wet space of the motor vehicle door is located between the door inner skin and a door outer skin, which forms an outer design surface of the motor vehicle door. The dry space is located, in contrast, on the side of the door inner skin facing the vehicle interior, which is generally covered by means of an inner door lining.

A unit support 1 of the type shown in FIG. 1a which in the embodiment consists of plastics, but however may be made from a different material, such as for example metal, receives both on its surface on the dry space side and on its surface 10 on the wet space side—visible in the view according to FIG. 1a—functional components of the motor vehicle door, which before the installation of the unit support 1 may be premounted thereon and then arranged together with the unit support 1 as a completely prefabricated door module on a motor vehicle door. Thus primarily moisture-sensitive functional components—not visible in FIG. 1a—such as for example electrical and electronic components may be provided on the dry space side of the unit support 1 and, in particular, moisture-insensitive functional components, such as for example the adjusting mechanism of a window lifter may be provided on the surface 10 on the wet space side of the unit support 1.

In the unit support 1 shown in FIG. 1a, on the surface 10 on the wet space side a guide rail 2 is integrally formed on which a drive element 5 is longitudinally movably guided in a direction of adjustment E of a window pane to be adjusted by means of the window lifter. The direction of adjustment E which coincides with the direction of extension of the guide rail 2, extends substantially along the vertical vehicle axis z and thus transversely to the longitudinal vehicle axis x.

In the region of its upper and lower end portion 2a and/or 2b—viewed in the direction of adjustment z—formed on the guide rail 2 is respectively one hollow body 3a, 3b in the form of a hollow nose, which substantially fully encloses a hollow space with a base body 30, and on which a deflection element 43 and/or 44 is positioned, which serves to deflect a flexible traction means (in particular in the form of a cable) via which the drive element 5 is coupled to an adjusting drive of the window lifter.

The drive motor of the adjusting drive and a possibly associated electronic control unit may be arranged on the surface on the dry space side of the unit support 1, not visible in FIG. 1a. A gear of the adjusting drive arranged downstream of the drive motor, via which, during operation of the drive motor by means of a cable drum or the like, the adjusting force generated by the drive motor is introduced into the traction means provided for actuating the drive element 5, may, however, be preferably fastened to the surface 10 on the wet space side of the unit support 1. To this end, corresponding fastening means B are provided.

Moreover, in the unit support 1 a receiver opening L may be seen for a speaker.

Figure 1B:
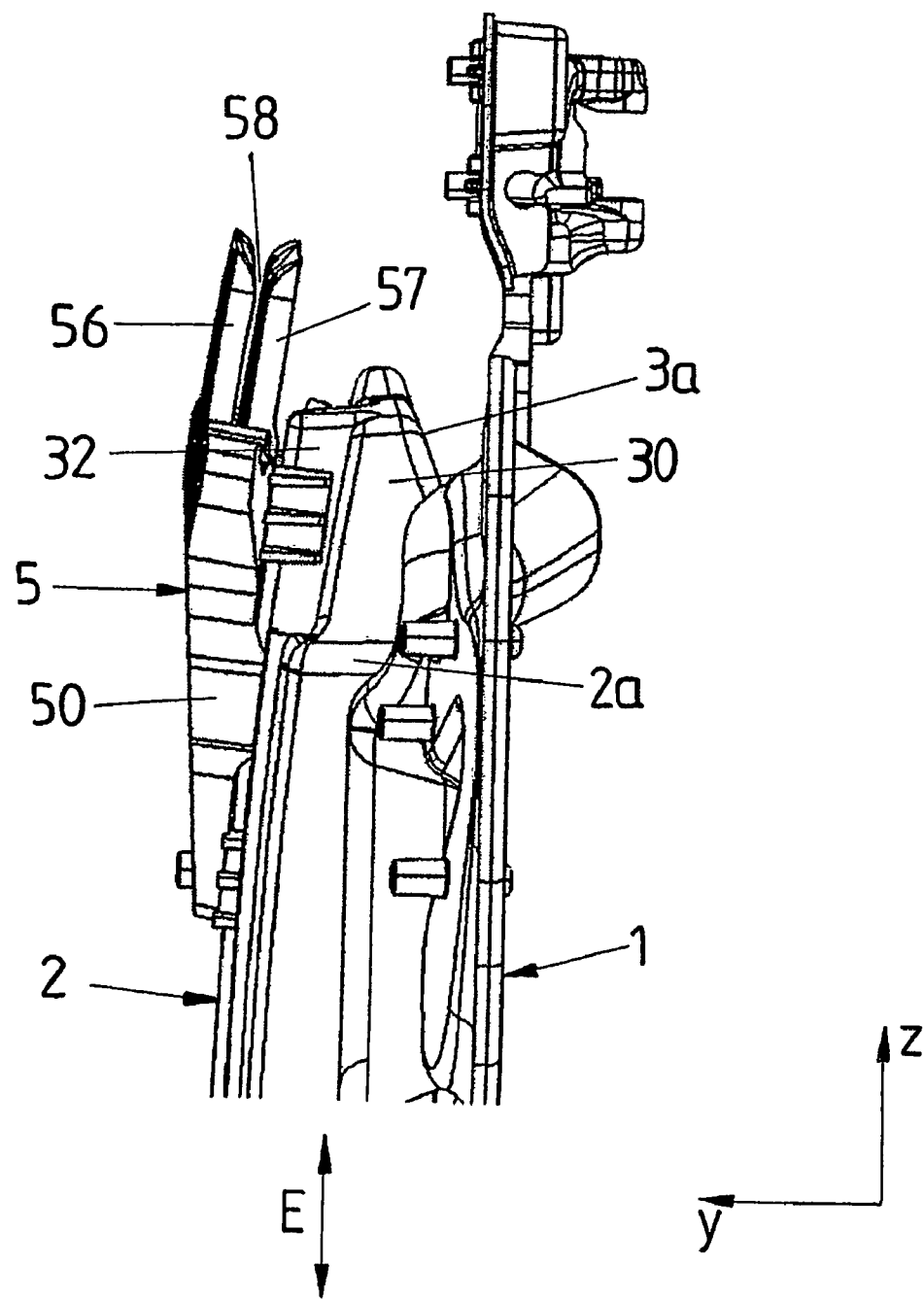
FIG. 1b shows a perspective view of the guide rail of FIG. 1a in the region of the upper end thereof.

The upper end portion of the guide rail 2 integrally formed on the unit support 1 consisting of plastics, is shown in FIG. 1b. Said guide rail in this case has an integrally formed, substantially closed hollow body 3a, in the form of a hollow nose on which the upper cable deflection element 43 shown in FIG. 1a—but not shown therewith in FIG. 1b for better visibility of the hollow body 3a—may be positioned, as shown in FIG. 1c. Moreover, the hollow body 3a in the form of a hollow nose forms a means for increasing the length of travel, by allowing a guiding of the drive element 5 beyond the upper end portion 2a of the guide rail 1. To this end, the hollow body 3a is provided with integrally formed guide surfaces 32 for the drive element 5.

With reference to FIG. 1b it may also be seen that the drive element 5 has a base body 50, via which it is guided in the known manner positively but displaceably in the direction of adjustment z on the guide rail 2. Moreover, the drive element 5 has a window receiver 58 for a window pane to be adjusted which is formed between two clamping jaws 56, 57 of the drive element 5, and in which the window pane may be received in a clamping and additionally positive manner, for example by means of a fastening pin penetrating a window opening.

FIG. 6a shows a unit support 1 of the type disclosed with reference to FIGS. 1a and 1b after installation in a motor vehicle door. From the motor vehicle door, the wet space side of a door inner skin I may be seen in FIG. 6a, as well as a window frame R connected to the door inner skin, which defines a window opening O which may be closed by means of a window pane S. The window pane S may, by means of an associated window lifter in a direction of adjustment which substantially corresponds to the vertical vehicle axis z, be raised and lowered in order to close or open the window opening O.

The window lifter comprises to this end an adjusting drive 4 with a drive motor 40 and a downstream gear 41 which converts the drive torque generated during operation of the drive motor 40 into a rotational movement of a cable drum which is wrapped around by a flexible traction means 42 in the form of a cable. Said cable is able to be deflected by means of the upper and lower cable deflection elements 43, 44 shown in FIG. 1a and provided on the upper and lower end portion 2a, 2b of the guide rail 2 such that a portion of the traction means 42 extends along the guide rail 2 and thus in the direction of adjustment of the window pane S to be adjusted.

The portion of the traction means guided along the guide rail 2 is connected to the drive element 5 mounted longitudinally displaceably on the guide rail 2, so that said drive element during operation of the drive motor 40—depending on the rotational direction thereof—is raised or lowered by the traction means 42 along the guide rail 2. As a result, in a corresponding manner, the window pane S received by the drive element is raised in the direction of adjustment z for closing the window opening O or lowered for opening the window opening O.

With reference to FIGS. 2b to 6, various embodiments of the guide rail 2 integrally formed on the unit support 1 will now be explained.

According to FIG. 6b, two projections 21, 22 spaced apart from one another project from the surface 10 on the wet space side of the unit support 1 transversely to the direction of adjustment of the drive element 5 and the window pane S to be adjusted, namely along the longitudinal vehicle axis x, and which respectively have an angled portion 23 and/or 24, in this case in the form of one respective angled end portion. The two angled end portions 23, 24 are thus spatially oriented such that they extend substantially parallel to the surface 10 on the wet space side of the unit support 1 and face one another. The two projections 21, 22 form with their angled end portions 23, 24 as well as with the surface 10 on the wet space side of the unit support 1 respectively one guide channel K1 and/or K2 for guiding the drive element 5.

Moreover, between the two guide channels K1, K2 and/or the corresponding projections 21, 22 provided with angled end portions 23, 24, a further projection 25 is formed on the surface 10 on the wet space side of the unit support 1, which conically widens at the transition with the surface 10 on the wet space side of the unit support 1. Below the conical widening 25a of said central projection 25 on the unit support 1 a bead 15 is configured such that the unit support 1 as well as the guide rail 2 formed on the unit support 1 and formed by the projections 21, 22 25, generally have a substantially uniform material thickness d.

The drive element 5 guided on the guide rail 2 has a total of three guide portions on its base body 50 used for guiding, of which two lateral guide portions 51, 53 and/or 52, 54 are provided for guiding in respectively one of the guide channels K1, K2 and a third central guide portion 55 is used for guiding on the central projection 25 of the guide rail 2.

The two lateral guide portions 51, 53 and 52, 54 of the drive element 5 have one respective web 51 and/or 52 which engages under an angled end portion 23 and/or 24 of the two lateral projections 21, 22 of the guide rail 2. Moreover, on the lateral guide portions 51, 53; 52, 54 of the drive element 5 one respective further web 53 and/or 54 is provided which overlaps the associated angled end portion 23 and/or 24.

The central guide portion 55 on the base body 50 of the drive element 5 forms a receiver which encompasses the central projection 25 of the guide rail 2.

Thus the drive element 5 in both spatial directions x (longitudinal vehicle axis) and y (horizontal vehicle transverse axis) which extend substantially perpendicular to the direction of adjustment of the drive element 5 and the window pane S, is positively guided in a defined manner on the guide rail 2. The central projection 25 of the guide rail 2 thus serves to position the drive element 5 relative to the longitudinal vehicle axis x so that said drive element is not able to carry out any movements in said spatial direction x. The two lateral guide channels K1, K2 of the guide rails 2 serve, however, to position the drive element 5 along the horizontal vehicle transverse axis y so that the drive element 5 is also not able to perform any movements in this direction. The drive element 5 is thus exclusively movably mounted on the guide rail 2 in the direction of adjustment z, see FIG. 6*a*.

In FIG. 6*c*, a modification of the embodiment of FIG. 6*b* is shown, the difference being that the angled end portions 23', 24' of the projections 21, 22 forming the guide channels K1, K2 and formed on the unit support 1 extend at an angle to the surface 10 on the wet space side of the unit support 1, and namely such that toward the free ends of the two angled end portions 23', 24' the distance from the surface 10 on the wet space side of the unit support 1 is increased. This facilitates the ability of the guide rail 2 to be produced by an injection molding process, as the demolding of the injection mold used in this connection is simplified, as will be explained below with reference to FIG. 11.

The guide surfaces 32 described in more detail above with reference to FIG. 1*b* and formed integrally on the upper hollow body 3*a* serve to extend the guide surfaces of the guide rail 2 forming guide channels, shown above with reference to FIGS. 6*a* to 6*c*, in the direction of extension E of the guide rail 2 and thus the direction of adjustment of the window lifter. Said guide surfaces form an extension of the guide rail 2 and/or more specifically the guide surfaces/guide channels of the guide rail 2 in the direction of adjustment E. This causes an increase in the length of travel, i.e. an increase in the maximum adjusting path of the drive element 5 on the guide rail 2 in the direction of adjustment E, by the guide surfaces 32 provided on the hollow body 3*a*, permitting a guiding of the drive element 5 in the direction of adjustment E beyond the upper end portion 2*a* of the guide rail 2. The same applies to the lower hollow body 3*b* shown in FIG. 1*a*, which is attached to the lower end portion 2*b* of the guide rail 2 and is of substantially identical configuration to the upper hollow body 3*a* described with reference to FIGS. 1*b* and 1*c*.

In addition to an extension of the guide surfaces for the drive element 5 in the direction of adjustment E the hollow bodies 3*a*, 3*b* also permit the mounting of the deflection elements 43, 44 of the window lifter which also contributes to an increase in the length of travel, as will be described below in further detail with reference to FIG. 2.

FIG. 7 shows a further modification of the embodiment of FIG. 6*b*, in this case the difference being such that the lateral guide portions of the drive element 5 merely have first webs 51, 52 which engage under the angled end portions 23, 24 of the projections 21, 22 forming the guide channels K1, K2, i.e. project into the respective guide channel K1, K2, but no second webs, which overlap said lateral end portions 53, 54. Thus by the engagement of the lateral guide portions of the drive element 5 in the guide channels K1, K2 only a positioning of the drive element 5 in a spatial direction +y parallel to the horizontal vehicle transverse axis y is ensured. The positioning in the opposing spatial direction −y is thus additionally undertaken by the central projection 25 of the guide rail 2, the free end thereof to this end cooperating with a bottom face of the recess 55 in the base body 50 of the drive element 5 encompassing the central projection 25.

In this case, individual reinforcing ribs 6 may optionally be locally provided on the lateral projections 21, 22 on the side remote from the respective guide channel K1, K2, in order to eliminate a tendency to distortion.

Moreover, the connecting regions 50*a*, 50*b* in the form of arms, via which the lateral guide portions 51, 52 of the drive element 5 are connected to the base body 50 thereof, may be configured to be resilient, in order to allow tolerance compensation along the horizontal vehicle transverse axis y.

The embodiment shown in FIG. 8 of a guide rail 2 differs from that shown in FIG. 6*b* in that the angled end portions 23", 24" of the projections 21, 22 forming the guide channels K1, K2 face in opposing directions from one another. As a result, the two guide channels K1, K2—viewed from the central projection 25 of the guide rail—are arranged on the other side of the lateral projections 21, 22. This produces a corresponding shape of the drive element 5, so that said drive element in turn engages behind said angled end portions 23", 24" with its lateral guide portions.

Provided that the drive element 5 with its two lateral guide portions engages behind and/or encompasses not only the respective angled end portions 23, 24 and/or 23", 24" of the lateral projections 21, 22, but additionally also encompasses said projections 21, 22 themselves, the central projection 25 for guiding the drive element may be entirely dispensed with, as shown in FIG. 9. In this case, the guide channels K1, K2 and/or the projections 21, 22 with the angled end portions 23, 24 or 23", 24" undertake the positioning of the drive element 5 in all spatial directions x, y, perpendicular to the direction of adjustment z, i.e. both along the longitudinal vehicle axis x and also along the horizontal vehicle transverse axis y, see FIG. 9*a* with the lateral guide portion 51' of the drive element 5 shown by way of example.

Figure 10:
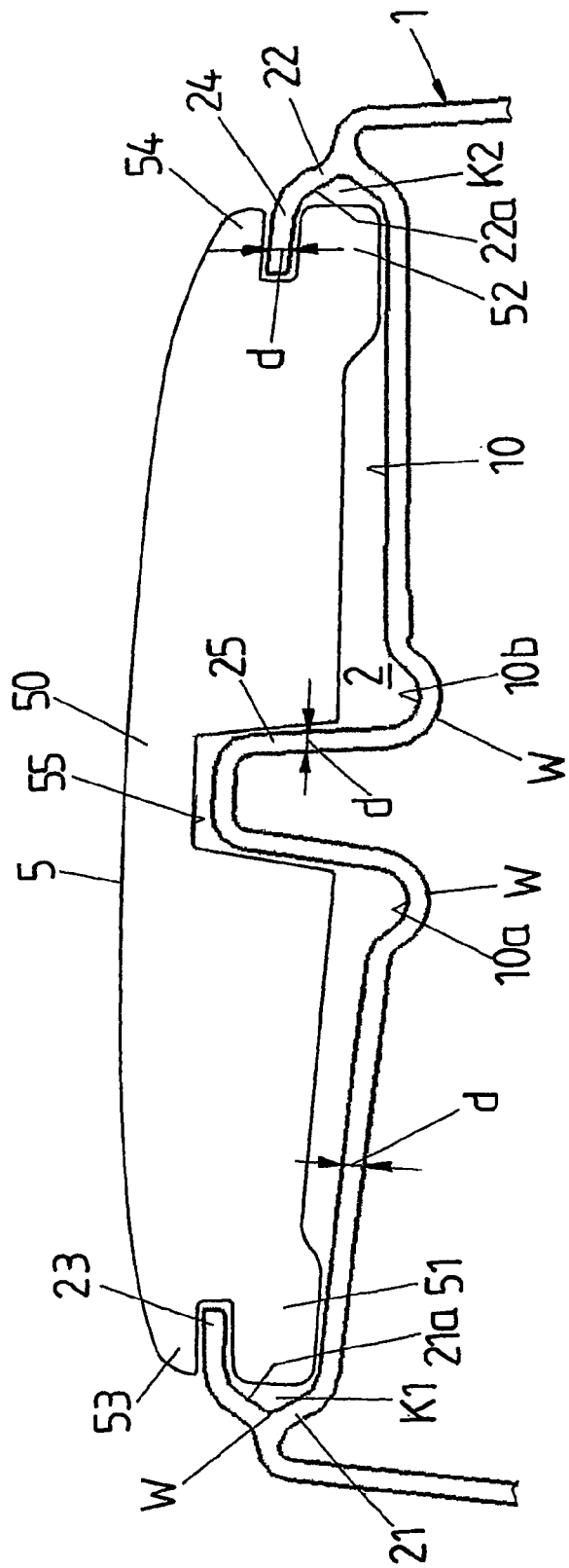
FIG. 10 shows a cross-section taken through the line V-V$^1$ of FIG. 6a of a fifth modification of the guide rail of FIG. 6b.

FIG. 10 finally shows a development of the guide rail shown in FIG. 6*b*, in which both in the two lateral guide channels K1, K2 and at the transition between the central projection 25 of the guide rail 2 and the unit support 1 bulged portions 21*a*, 22*a* and/or 10*a*, 10*b* are respectively formed. Said bulged portions do not serve to guide the drive element 5, i.e. the drive element 5 does not engage in said bulged portions 10*a*, 10*b*; 21*a*, 22*a*, but they serve instead to maximize the rigidity of the guide rail 2 formed on the unit support 1 where the material thickness d of the unit support 1 is generally uniform in the region of the guide rail 2 including the projections 21, 22, 25 thereof.

In FIG. 11, three sliding cores S1, S2, S3 of an injection mold are shown, of which a central sliding core S1 serves to form the central projection 25 of the guide rail 2 shown in FIG. 10, and two further sliding cores S2, S3 to form the guide channels K1, K2 of the guide rail 2 shown in FIG. 10, and namely including the bulged portions 10*a*, 10*b*; 21*a*, 22*a* provided there.

For demolding the injection mold, according to the numbers shown in FIG. 11, firstly the sliding core S1 serving to form the central projection 25 of the guide rail 2, is moved away therefrom, perpendicular to the extension plane of the unit support 1. Subsequently, the two sliding cores S2, S3 serving to form the lateral guide channels K1, K2 are firstly disengaged from the guide channels K1, K2 by a limited movement parallel to the extension plane of the unit support 1 and then removed by a movement perpendicular to the extension plane of the unit support 1.

FIG. 2 shows a cross section through a unit support 1 (defined by a peripheral outer edge 11) of the type shown in FIG. 1a in the region of its upper end after installation in a motor vehicle door, as shown in FIG. 6a, but in a modified embodiment.

An essential difference is that according to FIG. 2 a guide rail 102 is provided which is not formed integrally on the unit support 1 but is secured to the unit support 1 as a separate functional component.

To this end, on the upper hollow body 3a which is formed on the upper edge of the unit support 1, and projects therefrom in the direction of extension E of the guide rail 102, a bearing pin 35 is formed which simultaneously serves to mount rotatably a deflection element 143 and to fix the guide rail 102. The bearing pin 35 penetrates a bearing opening 143b of the deflection element 143 in the form of a bearing roller which on the outer periphery has a cable guide 143a for a flexible tractive means and, moreover, penetrates a fastening opening of the guide rail 102 flush with the bearing opening 143b. The free end 36 of the bearing in 35 remote from the unit support 1 and the hollow body 3a formed thereon, is plastically deformed after positioning the deflection element 143 in the form of a deflection roller and the guide rail 102, so that it overlaps at its edge the fastening opening of the guide rail 102 as a fastening head 36'. As a result, the guide rail 102 in the region of its upper end is fixed to the unit support 1 and/or more specifically to the hollow body 3a formed there. At the same time, the deflection element 143 in the form of a roller is rotatably mounted on the bearing pin 35 projecting from the hollow body 3a and is thus overlapped by a portion of the guide rail 102.

With reference to FIG. 2 it may also be seen that the unit support 1 with its angled upper edge portion of the peripheral edge 11 bears via a seal D against the door inner skin I of a motor vehicle door, reinforced by a window sill reinforcement B, so that it may close the cutout A provided in the door inner skin I in a moisture-tight manner.

Moreover, it is clear in FIG. 2 that the hollow body 3a projects in the direction of extension E of the guide rail 102, and thus the direction of adjustment of the window lifter, over the seal D via which the unit support 1 with an edge portion of its peripheral edge 11 bears against the door inner skin I in a moisture-tight manner, the hollow body 3a along the vertical vehicle transverse axis y (extending transversely to the door plane) also being spaced apart from the upper edge portion of the unit support 1 provided with the seal D. This causes the already disclosed increase in the length of travel in the direction of adjustment E without the wet/dry space partition being compromised, and for which the moisture-tight bearing of the unit support 1 against the door inner skin I is essential.

The increase in the length of travel is thus not achieved in the embodiment shown in FIG. 2 by guide surfaces being provided on the upper hollow body 3a for a drive element to be guided on the guide rail 102, but instead—viewed in the direction of adjustment E—by the upper fastening point of the guide rail 102 as well as the bearing point of the deflection element 143 being displaced upwards in the direction of adjustment E—compared with a unit support formed without hollow bodies—such that the guide rail 102 as well as the deflection element 143 project in the direction of adjustment E over the upper edge portion 11 of the unit support 1 bearing by means of the seal D against the door inner skin I.

Moreover, the substantially enclosed hollow body 3a formed as a hollow nose, the base body 30 thereof merely having one opening 39 on its lower end—in the direction of adjustment E—and the opening cross section thereof being substantially oriented perpendicular to the surface spanned by the unit support 1, causes a reinforcement of the unit support 1 in the region of the connecting points of the guide rail 102 as well as the deflection roller 143, where during operation of the window lifter correspondingly large adjusting forces act.

As viewing FIG. 2 with the complete view of a unit support 1 according to FIG. 1 shows, the cross-sectional surface of the opening 39—relative to the installed state of the unit support 1 in a motor vehicle—extends substantially along the plane (xy plane) spanned by the longitudinal vehicle axis x and the horizontal vehicle transverse axis y, whilst the unit support 1 extends substantially along the plane (xz plane) spanned by the longitudinal vehicle axis x and the vertical vehicle axis z. The horizontal vehicle transverse axis y is thus characterized in that it extends from one vehicle door, perpendicular to the door plane of the directly opposing vehicle door, i.e. approximately from the driver's door to the passenger door.

Moreover, by viewing together FIGS. 1a and 2 it may be seen that the opening 39 of the hollow body 3a faces the middle region ZB (central region) of the unit support 1. By the term "central region ZB of the unit support 1" is, in this case, understood the region which is located along the vertical vehicle axis z, i.e. in a direction extending from the lower edge to the upper edge of the unit support, approximately in the center of the unit support. In other words, the opening 39 of the hollow body 3a located according to FIG. 2 on an upper edge portion of the outer edge 11 of the unit support 1, faces toward the opposing lower edge portion of the outer edge 11 and thus also toward the central region ZB of the unit support 1, which is located between the upper and lower edge of the unit support 1.

Below the upper and lower edge of the unit support 1, therefore, those edge portions of the peripheral outer edge 11 of the unit support 1 are considered which upwardly and downwardly define the unit support—relative to its state when installed in a motor vehicle.

FIG. 3a shows schematically the construction of a door structure of a motor vehicle door, into which a unit support 1 of the aforementioned type may be installed. The door structure comprises a door inner skin I provided with a large-surface cutout A which—viewed along the vertical vehicle axis z—is defined upwardly by a window sill reinforcement B. A window frame R defining a window opening O is, in turn, attached thereto toward the top.

Tongue-like extensions F project downwardly from the window sill reinforcement B—viewed along the vertical vehicle axis z—which project over the large-surface cutout A of the door inner skin I and are provided at that point with bearings L, respectively in the form of a bearing opening.

FIG. 3b shows a cross section through the door structure of FIG. 3a in the region of the window sill reinforcement B, together with a unit support 1 installed in the door structure, covering the large-surface cutout A of the door inner skin I, on which a guide rail 2 is integrally formed and which in the region of the upper end portion 2a of the guide rail 2 is provided with a hollow body 3a which is also integrally formed. The unit support 1 bears at its upper edge portion 11 via a seal D against the edge surrounding the large-surface cutout A of the door inner skin I, the hollow body 3a formed on the unit support and/or on the upper end portion 2a of the guide rail 2 projecting over said sealing region in the direction of adjustment E of the window lifter and thus along the vertical vehicle axis z. The hollow body 3a extends therefore—viewed along the horizontal vehicle transverse axis y—between the door inner skin I and the extension F of the window sill reinforcement B.

A bearing pin 35 in turn projects from the hollow body 3a on which a deflection element 143 is rotatably mounted, which serves to deflect a flexible traction means 42 of a motor vehicle window lifter, the bearing pin 35 moreover engaging with its free end 36 remote from the hollow body 3a a bearing opening L in one of the tongue-like extensions F projecting downwardly from the window sill reinforcement B. As a result, the deflection element 143 is received in the form of a deflection roller between the hollow body 3a and the tongue-like extension F of the window sill reinforcement B, in the bearing opening L thereof, moreover, the bearing pin 35 formed integrally on the hollow body 3a being supported, the free end 36 thereof being able to be optionally deformed as shown in FIG. 1c.

Due to a total of two tongue-like extensions F projecting downwardly according to FIG. 3a from the window sill reinforcement B, the door structure shown at that point is suitable for receiving a unit support with a double-stranded cable window lifter, i.e. with a window lifter which comprises two guide rails arranged adjacent to one another, spaced apart from one another along the longitudinal vehicle axis x and extending respectively substantially along the vertical vehicle axis z.

Figure 4:
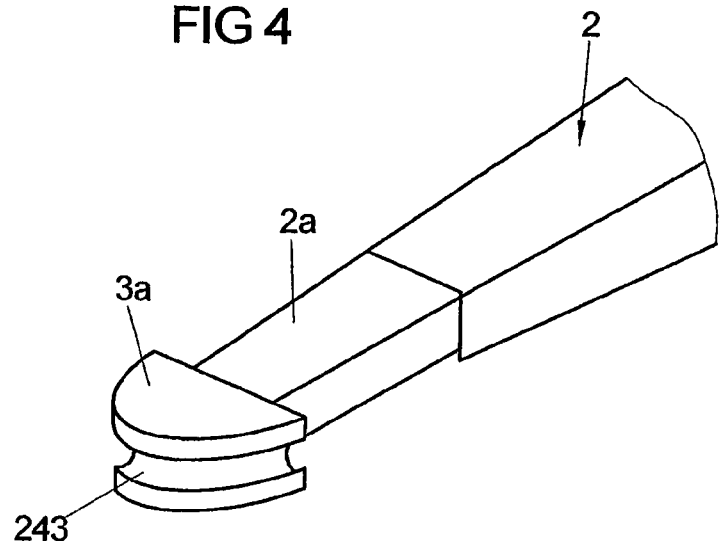
FIG. 4 shows a perspective view of the upper end of a guide rail of a motor vehicle window lifter in a further embodiment.

FIG. 4 shows a guide rail 2 for a motor vehicle window lifter which, in the manner disclosed above with reference to FIGS. 1a to 1c, may be integrally formed on a unit support 1 of a motor vehicle door, and on the upper end portion 2a thereof a hollow body 3a is formed, on which in turn a deflection region 243 for a flexible traction means of a window lifter is formed.

Figure 5:
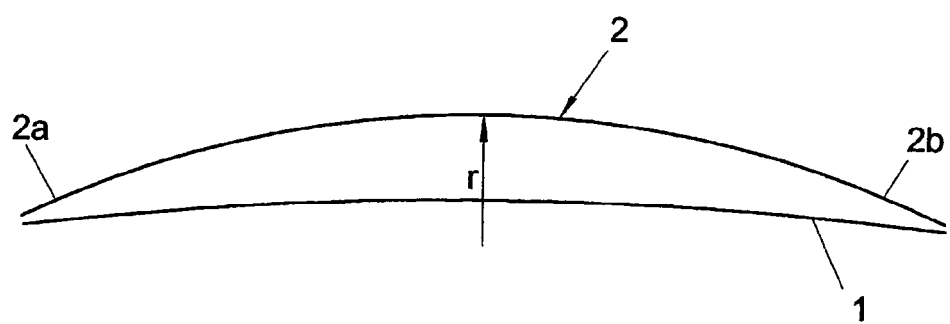
FIG. 5 shows a schematic view of a cross section through a further unit support with a guide rail arranged thereon.

FIG. 5 finally shows a unit support 1 together with a curved guide rail 2 formed thereon, the radius of curvature r thereof extending substantially perpendicular to the bottom face (for example in the form of a plane) spanned by the unit support 1. By fastening the guide rail 2 to the unit support 1 in the region of its two end portions 2a, 2b an additional reinforcement of the arrangement is achieved according to a "bridge effect".

The invention claimed is:

1. A unit support for a motor vehicle door configured and provided for installation in the motor vehicle door and wherein in an installed state the unit support forms at least one part of a door inner skin of the motor vehicle door, the unit support comprising:
   at least one longitudinally extended guide rail of a motor vehicle window lifter arranged on the unit support, wherein the guide rail extends between a first and a second end portion and wherein a drive element configured to receive a window pane to be adjusted along an adjusting path of the guide rail defined by guide surfaces is movably guided on the guide rail;
   a hollow body integrally formed in a region of at least one end portion of the guide rail, and wherein in order to increase a length of travel of the motor vehicle window lifter in a direction of extension of the guide rail, the hollow body is configured to at least one of:
   a) extend the guide surfaces of the guide rail serving to guide the drive element and defining the adjusting path, and
   b) include a deflection element configured to deflect a flexible traction device of the window lifter.

2. The unit support of claim 1, wherein the hollow body is configured as a hollow body open on one side, but closed on all remaining sides.

3. The unit support of claim 1, wherein the hollow body has only one opening on a front face.

4. The unit support of claim 3, wherein a cross-sectional area of the opening extends substantially transversely to a plane spanned by the unit support.

5. The unit support of claim 3, wherein the opening faces a central region of the unit support.

6. The unit support of claim 1, wherein the hollow body extends in the direction of extension of the guide rail.

7. The unit support of claim 1, wherein the hollow body extends the adjusting path of the guide surfaces defining the guide rail in the direction of extension of the guide rail.

8. The unit support of claim 1, wherein the hollow body projects over an end portion of the guide rail.

9. The unit support of claim 1, wherein the hollow body tapers in the direction of extension of the guide rail.

10. The unit support of claim 9, wherein the hollow body tapers away from the at least one end portion of the guide rail.

11. The unit support of claim 1, wherein the guide rail is a separate component fastened to the unit support.

12. The unit support of claim 1, wherein the guide rail is integrally formed on the unit support.

13. The unit support of claim 12, wherein the hollow body is formed on the guide rail.

14. The unit support of claim 13, wherein the hollow body is configured as an integrally formed extension of an end portion of the guide rail.

15. The unit support of claim 12, wherein the guide rail formed integrally on the unit support comprises at least two guide channels spaced apart from one another transversely to the direction of adjustment of the drive element defined by the adjusting path, and wherein one respective guide portion of the drive element is guided in the guide channels.

16. The unit support of claim 15, wherein the respective guide channel is foamed by a projection projecting from a surface of the unit support wherein together with the surface of the unit support defines a channel-shaped guide for one respective guide portion of the drive element.

17. The unit support of claim 16, wherein each projection comprises an angled portion which overlaps a guide portion of the drive element.

18. The unit support of claim 17, wherein the respective guide portion of the drive element encompasses the angled portion.

19. The unit support of claim 17, wherein the angled portions extend respectively at an angle from a surface of the unit support on which the projections associated with the angled portions are formed.

20. The unit support of claim 19, wherein the angled portions extend at an angle such that the angled portions face away from the surface of the unit support with free ends of the angled portions.

21. The unit support of claim 16, wherein the two angled portions are oriented in different directions.

22. The unit support of claim 21, wherein the two angled portions are oriented toward one another.

23. The unit support of claim 21, wherein the two angled portions are oriented away from one another.

24. The unit support of claim 15, wherein on the unit support, in addition to the at least two guide channels, a further guide region is formed as a component of the guide rail.

25. The unit support of claim 24, wherein the additional guide region extends between the two guide channels.

26. The drive element of claim 25, wherein the additional guide region extends along the adjusting path and when viewed transversely to the adjusting path, is spaced apart from the two guide channels.

27. The unit support of claim 24, wherein the additional guide region is formed by a projection projecting from a surface of the unit support.

28. The unit support of claim 27, wherein the additional guide region does not have an angled portion.

29. The unit support of claim 15, wherein the unit support in the region in which the guide rail is formed comprises at least one of beads and bulged portions.

30. The unit support of claim 29, wherein the at least one of beads and bulged portions are spaced apart from the drive element guided on the guide rail, so that the at least one of the beads and bulged portions do not form a guide surface for the drive element.

31. The unit support of claim 1, wherein the hollow body comprises hollow body guide surfaces for the drive element guided on the guide rail.

32. The unit support of claim 31, wherein the hollow body guide surfaces extend at least one part of guide surfaces provided on the guide rail and define the adjusting path beyond the at least one end portion of the guide rail.

33. The unit support of claim 1, further comprising a deflection element wherein on the hollow body a flexible traction device of the motor vehicle window lifter is deflected by the deflection element such that the flexible traction device is extended by a partial portion along the guide rail.

34. The unit support of claim 33, wherein the deflection element is formed integrally on the hollow body.

35. The unit support of claim 33, wherein the deflection element is configured as a separate subassembly on the hollow body.

36. The unit support of claim 33, wherein the deflection element is rotatably mounted as a deflection roller on the hollow body.

37. The unit support of claim 36, wherein the deflection element is mounted on a bearing pin projecting from the hollow body.

38. The unit support of claim 37, wherein the bearing pin comprises a widening on a front face and at least partially overlaps the deflection element.

39. The unit support of claim 38, wherein the widening is formed by plastic deformation of the bearing pin.

40. The unit support of claim 33, wherein the deflection element arranged on the hollow body in the installed state is overlapped by an extension of a window sill reinforcement of the door structure.

41. The unit support of claim 1, comprising a peripheral outer edge bearing against at least one subassembly of the door structure in the installed state, and wherein the hollow body projects in the direction of extension of the guide rail over a portion of the peripheral outer edge of the unit support.

42. The unit support of claim 41, wherein the hollow body projects in the direction of extension of the guide rail over a seal, wherein the unit support in the installed state bears against at least one subassembly of the door structure with the seal.

43. The unit support of claim 1, further comprising another hollow body formed on the unit support, wherein each hollow body is associated with a corresponding one of the two end portions of the guide rail.

44. The unit support of claim 1, wherein the hollow body encloses a hollow space and comprises one opening on a front face, a cross section of the opening being oriented substantially perpendicular to a surface spanned by the unit support.

45. The unit support of claim 1, wherein the hollow body is configured as a hollow nose.

46. The unit support of claim 1, wherein the unit support consists of plastics.

47. The unit support of claim 1, wherein the unit support in the region of the guide rail has a uniform material thickness.

48. The unit support of claim 1, wherein two guide rails are arranged adjacent to one another and spaced apart from one another transversely to their respective direction of extension, and wherein the guide rails respectively extend between a first and a second end portion, wherein in a region of at least one end portion of one of the guide rails the hollow body is integrally formed which projects in the direction of extension of the guide rail over an end portion of the guide rail.

* * * * *